Patented Sept. 19, 1922.

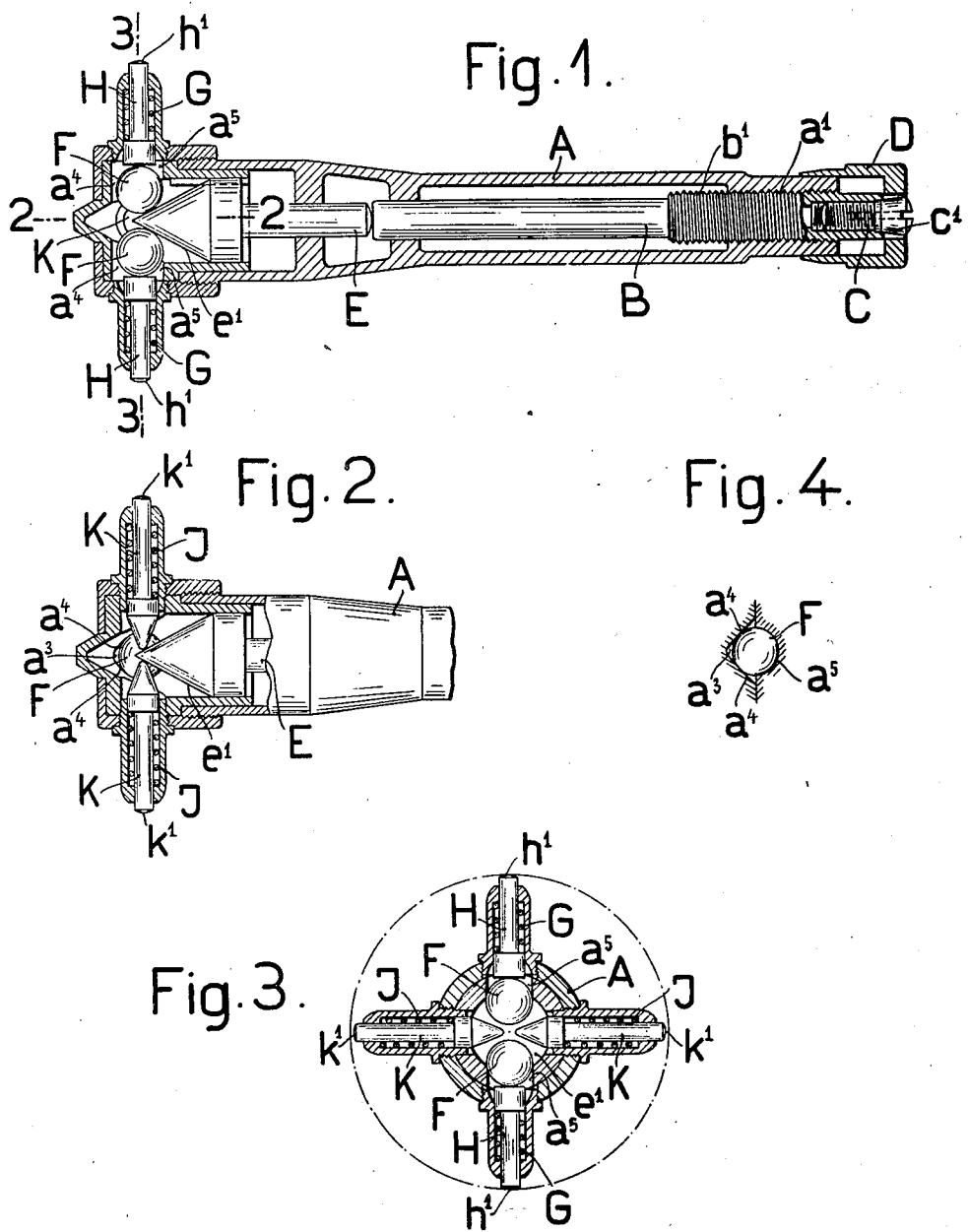

1,429,556

UNITED STATES PATENT OFFICE.

MAX BARTHOLDY, OF ESSEN, GERMANY, ASSIGNOR TO FRIED. KRUPP AKTIEN-GESELLSCHAFT, OF ESSEN-ON-THE-RUHR, GERMANY.

INSIDE GAUGE.

Application filed December 29, 1921. Serial No. 525,678.

*To all whom it may concern:*

Be it known that I, MAX BARTHOLDY, residing at Essen, Germany, a citizen of the German Republic, have invented a certain new and useful Improvement in Inside Gauges, of which the following is a specification.

This invention relates to inside gauges comprising two gauge pins and two supporting pins, and has for its object to so construct gauges of this kind that they are adapted for measuring holes of different diameters, without the influence of the supporting bolts upon correct measuring being thereby affected.

An inside screw-gauge embodying the invention is illustrated by way of example in the drawing, in which:

Fig. 1 is an axial longitudinal section of the gauge,

Fig. 2 is a similar section on line 2—2 of Fig. 1, looking from above, with part of the gauge body in elevation, Fig. 3 is a cross section on line 3—3 of Fig. 1, looking from the left, and, Fig. 4 is a section through a detail.

In the gauge body A is a longitudinally adjustable bolt B, screw-threaded at $b^1$ to engage an internal screw-thread $a^1$ in the body. The end of said bolt, projecting out of the body A, is slotted, so as to be expansible by a screw C having a conical head $c^1$, and thereby be rigidly connected to a thimble D, which encloses the cylindrical end of the body A and is graduated in the usual way circumferentially, the graduations (not shown) cooperating with a millimeter scale (also not shown) on the body A, to indicate the result of the measurement.

Against the end of the bolt B lying within the body A, bears the end of a second bolt E. The other end of the bolt E is provided with a conical surface $e^1$, on which rest two balls F, as shown in Figs. 1 and 3, and on said balls bear, under the influence of springs G, the gauge pins H. The balls F are guided, on their sides away from the bolt E, in grooves $a^3$, formed of plane surfaces $a^4$ at an angle to each other, see Fig. 4. On their other sides the balls F lie in semi-circular grooves $a^5$. At right angles to the pins H are mounted two supporting pins K, longitudinally movable against the pressure of springs J and held by the latter directly against the conical surface $e^1$, see Fig. 2. The distance between the end surfaces $k^1$ of the pins K is slightly less than the distance between the measuring surfaces $h^1$ of the pins H, and the former lie within a circle which touches the latter and the diameter of which is equal to the distance between the surfaces $h^1$, Fig. 3.

In use, the end of the gauge carrying the pins H and K is introduced into the bore to be measured, the thimble D is turned, and with it the bolt B, which is advanced by the screw-threads $a^1$, $b^1$ and transmits its longitudinal movement to the bolt E, the conical end $e^1$ of which, consequently, forces the balls F and measuring pins H outwardly. But at the same time, the supporting pins K are displaced by the cone $e^1$, and by the same amount as the pins H, so that the distance between their ends $k^1$ is always slightly less than the distance between the ends $h^1$ of the pins H. The pins K, therefore, act as backing-up supports, no matter what the diameter of the hole is, and assist the operator in making correct measurements. The thimble D is turned until the pins H come to bear with their ends $h^1$ on the wall of the bore. At this moment, the measurement is completed.

In consequence of the insertion of the balls F, guided in the grooves $a^3$, between the conical surface $e^1$ and the measuring pins H, the continued accuracy of the gauge is insured. If said pins bore directly upon said surface $e^1$, there would soon be manifest a wear of the guides of said pins H, which would result in making the measurements unreliable. It is unnecessary to provide balls for the supporting pins K, also since their end surfaces $k^1$ have no direct effect upon the measurement, and it is therefore immaterial if wear on the guides of the pins K causes the end surfaces $k^1$ to get slightly inaccurate.

Claims.

1. A gauge of the class described comprising a body, a pair of measuring pins supported by said body, a pair of relatively shorter supporting pins carried by said body and means adapted to displace said pins simultaneously during the measuring operation.

2. A gauge of the class described comprising a body, a pair of measuring pins supported by said body, a pair of relatively shorter supporting pins carried by said body and a member provided with a cone-shaped end adapted to displace said pins simultaneously during the measuring operation.

3. A gauge for measuring inside diameters comprising a body, supporting pins mounted on one end of said body, measuring pins mounted adjacent said supporting pins, an operating member provided with a conical head movable in said body, balls interposed between said measuring pins and the conical surface of said head, said supporting pins engaging directly upon said conical surface whereby said pins will be displaced upon a movement of said operating member.

4. A gauge for measuring inside diameters comprising a body, a longitudinally movable operating bolt, said bolt being provided with a head having a conical surface, a pair of displaceable supporting pins mounted in one end of said body and engaging with their inner ends the conical surface of said head, a pair of measuring pins mounted in the said end of the body, balls interposed between the inner end of said measuring pins and the conical surface of said head whereby displacement of said bolt causes a simultaneous displacement of said supporting and measuring pin.

The foregoing specification signed at Essen, Germany, this 29th day of November, 1921.

MAX BARTHOLDY.